United States Patent
Yan (10) Patent No.: US 7,600,027 B2
(45) Date of Patent: Oct. 6, 2009

(54) MANAGING MULTIPLE SESSIONS FOR A USER OF A PORTAL

(75) Inventor: Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 10/942,430

(22) Filed: Sep. 16, 2004

(65) Prior Publication Data

US 2006/0059125 A1    Mar. 16, 2006

(51) Int. Cl.
*G06F 15/16* (2006.01)

(52) U.S. Cl. .............. 709/227; 709/219; 709/203; 707/3; 707/10

(58) Field of Classification Search .......... 709/227, 709/219, 203; 707/3, 10
See application file for complete search history.

(56) References Cited

U.S. PATENT DOCUMENTS

| | | | |
|---|---|---|---|
| 6,327,628 B1 | 12/2001 | Anuff et al. | |
| 6,356,905 B1 | 3/2002 | Gershman et al. | |
| 6,460,084 B1 | 10/2002 | Van Horne et al. | |
| 6,732,178 B1 | 5/2004 | Van Horne et al. | |
| 6,757,719 B1 | 6/2004 | Lightman et al. | |
| 2004/0015476 A1* | 1/2004 | Twaddle | 707/1 |
| 2004/0098420 A1* | 5/2004 | Peng | 707/203 |
| 2004/0107256 A1* | 6/2004 | Odenwald et al. | 709/205 |
| 2005/0188051 A1* | 8/2005 | Sneh | 709/213 |

OTHER PUBLICATIONS

Priebe et al., "Towards Integrative Enterprise Knowledge Portals", CIKM '03, Nov. 3-8, 2003, New Orleans, LA., USA, pp. 8.
Pierce, M. et al., "Interoperable Web Services for Computational Portals", IEEE, 2002, pp. 1-12.

* cited by examiner

*Primary Examiner*—Saleh Najjar
*Assistant Examiner*—Thuong (Tina) T Nguyen
(74) *Attorney, Agent, or Firm*—Libby Z. Handelsman; Schubert Osterrieder & Nickelson PLLC (57) ABSTRACT

Methods for managing multiple sessions for a user on a portal are disclosed. More particularly, hardware and/or software for managing multiple user sessions with backend applications of a portal are disclosed. Embodiments include a portal having a client interaction module for interacting with a user and a portlet application module for interacting with a backend application on an application server. A further embodiment provides a session manager for retrieving application session data from an application session data cache and inserting it into a user request, and for removing application session data from a content transmission from a backend application. In some embodiments, a session data cache for storing portal session data and application session data is provided. The session data cache may store application session data for each session established by a user with backend applications.

1 Claim, 6 Drawing Sheets

MANAGING MULTIPLE SESSIONS FOR A USER OF A PORTAL

FIELD OF INVENTION

The present invention is in the field of computer systems. More particularly, the present invention relates to methods for managing sessions for a client on a portal, particularly for managing multiple sessions with different applications of the portal.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive" or "hard disk drive"), a pointing device such as a mouse, and an optional network interface adapter. One of the distinguishing characteristics of these systems is the use of a motherboard or system planar to electrically connect these components together. Examples of such personal computer systems are International Business Machine Corporation's (IBM's®) PC 300, ThinkCentre, ThinkPad, Aptiva, and IntelliStation series of personal computers.

Networks such as the Internet and corporate intranets provide a mechanism for users to transfer data among computers for information sharing, workplace collaboration, data collection, etc. Users gain access to networks such as the Internet by accessing a web server via personal Internet service providers (ISP's), broadband network connections, or high speed network connections through office systems. Typically, a user will view Internet or intranet content using a graphic browser application such as Microsoft Corporation's Internet Explorer, Netscape Communication Corporation's Navigator, Mozilla, Apple Corporation's Safari, etc. Browsers, at their most basic level of operation, permit users to connect to a given network site, download informational content from that site, and display that information to the user. To view additional information, the user designates a new network address (such as by selecting a link) whose contents then replace the previously displayed information on the user's computer display.

For traditional web applications, a single session is established for a user each time the user logs into the web server. Unlike desktop computers, a web server often handles many users simultaneously. A session management mechanism at the web server allows maintaining most of each user's state information (i.e., session information) at the web server while only passing necessary information (for instance, the session identifier) back to the user via cookies, Uniform Resource Locator (URL) rewriting, a Hypertext Markup Language (HTML) hidden field, etc.

As the amount of information available to users continues to dramatically increase, portals have become more and more popular for aggregating and displaying information to users. Portals are an entry point or gateway for access to other web sites and information and provide a single point of access to a wide variety of content, data, knowledge, and services throughout an enterprise or network. As such, they have become increasingly popular with users as a starting point (often designated as their "home page", the first page displayed when they start their browser) for their use of a network. Publicly accessible Internet portals include Yahoo! Corporation's My Yahoo!, Microsoft Corporation's MSN, Google Corporation's Google News, etc. More specialized portals also exist, such as news sites such as Cable News Network LP, LLLP ("CNN") CNN Interactive, MSNBC, sports sites such as ESPN Inc.'s ESPN.com, etc. Private portals, including Time Warner Inc.'s America On-Line (AOL) service, are also popular. Many large companies also provide portals on their corporate intranet for use by all of their employees or groups of employees.

Portals allow a user to view content or links to multiple other sites (at different network addresses) simultaneously on one display, rather than forcing users to only view content from one site at a time. An Internet portal could, for example, simultaneously provide users with content from a news service, weather service, sports score service, etc., with each service potentially being provided by a different site. If the user desired more information from any of those services, the user could select the link to that service and the portal would facilitate the connection between the user and the other site. A portal server that provides a portal typically has a session management mechanism to maintain the session information for each of the multiple transactions (i.e., access to multiple sites) with the user. In a traditional web server, each user only needs to establish one session with the server per login, whereas each user may need to establish several sessions to request the different services provided through a portal system, including one session for the primary portal server and an additional session for each backend application.

Each service or other application provided by a different site than the portal server's network site is often called a backend application. A session with each backend application accessed by the user may be required in addition to the session established with the portal for the same user. For instance, if a backend application requires a separate login, then a user session may be created by the backend application to trace user states of multiple transactions. Each backend application typically has its own session management mechanism, resulting in different types of session data passed to the user and different ways that the data is passed (e.g., cookies, URL rewriting, etc.). Portals may pass this session information, along with the content, generated by the backend applications to the user and forward the session information from the user to the backend applications. Because each backend application uses its own session management mechanism, session data may be lost because of session identifier collision when the same user identifier (e.g., cookie name) is used in different backend applications to hold session identifiers as a "collision" will occur from the repetitive use of the same identifier. This problem is exacerbated with Sun Microsystems, Inc.'s Java applications as a default session management cookie name (e.g., 'JSESSIONID' required by the Servlet specifications 2.3 and 2.4) may be required for all cookie-based session identifiers. When such default names are used by more than one application, the cookie names are not unique and a collision will occur.

Modifying the session management mechanisms of the backend applications so that collisions do not occur is one solution to the problem of collisions. This solution, however, would require a significant amount of time and resources to accomplish, as each backend application is often written by a different provider and changes to universal standards, such as Java, would be required. As portal owners continue to provide new, additional and varied content, the problem of ensuring that each backend application uses different names becomes more and more difficult.

Using a unified token as a session identifier, such as in Microsoft Corporation's Single Sign-On user authentication mechanism, has also been considered as a solution to the collision problem. In this solution, a portal server issues a token to the user in a cookie, which is stored in the user's browser memory and passed to all backend applications during the user's transactions. This solution is flawed, however, in a number of respects. First, all participating applications must agree on the format and name of the token, which may prove difficult when applications are created by different providers. Moreover, all participating applications must be in the same domain name server (DNS) domain, as cookies are issued with a domain name and will not work with others. A token mechanism will therefore require significant changes to existing applications and will be limited in its applicability, making it undesirable as a solution.

There is, therefore, a need for an easy and effective mechanism for managing multiple sessions on a portal, particularly for managing sessions from different applications. There is an even greater need for such a system when the applications are located in different domains.

SUMMARY OF THE INVENTION

The problems identified above are in large part addressed by methods for managing sessions on a portal. One embodiment provides a method for managing sessions on a portal. The method generally includes receiving a request from a user for contents of a backend application of a portal and inserting application session data from a session information cache into the user request if the application session information has been stored in the cache. The application session data may be generated by the backend application for the user when the user logs into the application. The method also generally includes forwarding the user request with the inserted application session data to the backend application. Further embodiments may include querying the session information cache for the application session data related to the backend application. A further embodiment provides for receiving a content transmission having application session data from the backend application, consolidating the received application session data into the session information cache, removing the user'application session data from the content transmission, and forwarding the content transmission without the application session data to the user.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods for managing multiple sessions for a user on a portal are disclosed. More particularly, hardware and/or software for managing multiple user sessions with backend applications of a portal are disclosed. Embodiments include a portal having a client interaction module for interacting with a user and a portlet application module for interacting with a backend application on an application server. A further embodiment provides a session manager for retrieving application session data from an application session data cache and inserting it into a user request, and for removing application session data from a content transmission from a backend application. In some embodiments, a session data cache for storing portal session data and application session data is provided. The session data cache may store application session data for each session established by a user with backend applications.

The disclosed embodiments provide a methodology and system whereby a user request for contents of an application of a portal may be transmitted to a portal server and the application session data for that user's session with the backend application may be inserted. After the application session data is inserted, the user request is forwarded to the backend application for processing. A content transmission from a backend application may be intercepted by the portal server and application session data removed before ultimate transmittal to the user. In these embodiments, the user (or the client computer system) need not have the application session data and instead only is exposed to portal session data. The disclosed embodiments accordingly provide an improved methodology and system for handling multiple user sessions, as each user only receives portal session data, not application session data. Application session data for each application is instead handled at a portal server, allowing for session data collisions to be avoided. The methodology and system of the disclosed embodiments may also minimize network traffic and save space on the user's system.

While specific embodiments will be described below with reference to particular configurations of hardware and/or software, those of skill in the art will realize that embodiments of the present invention may advantageously be implemented with other substantially equivalent hardware and/or software systems.

Figure 1:
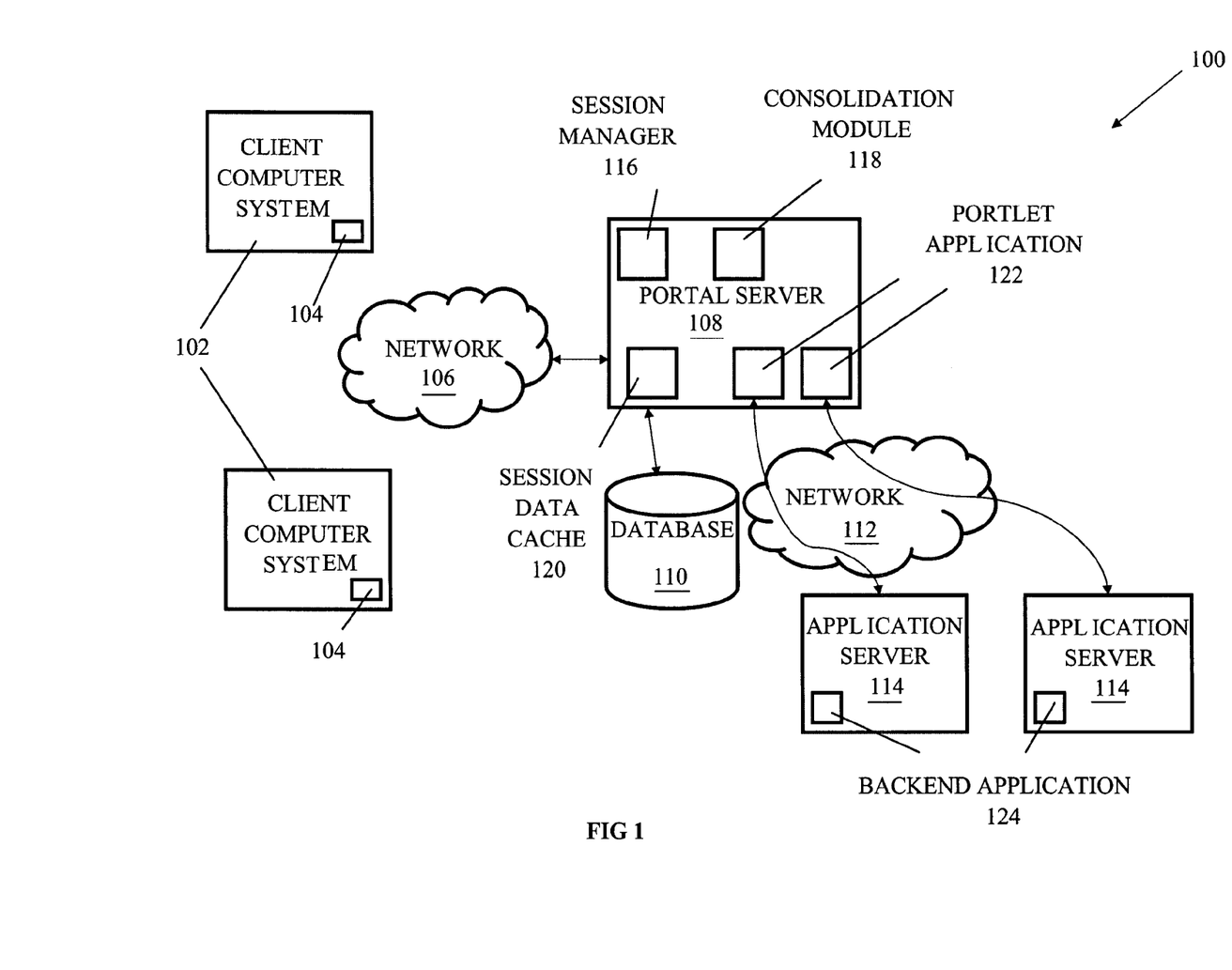
FIG. 1 depicts an environment for a system for managing multiple sessions of a user on a network using a portal according to one embodiment.

Turning now to the drawings, FIG. 1 depicts an environment for a system for managing multiple sessions of a user on a network using a portal according to one embodiment. In the depicted embodiment, session management system 100 includes a plurality of client computer systems 102 in communication with a network 106. Each client computer system 102 may include a browser 104 to allow a user of the client computer system 102 to access and view information on various network sites. Each client computer system 102 may be in communication with a portal server 108 via network 106. The portal server 108 provides, in one embodiment, a portal site that may be accessed and viewed by the user of a client computer system 102 using browser 104. Portal server 108 includes, in the depicted embodiment, a session manager 116, a consolidation module 118, a session data cache 120, and one or more portlet applications 122. Optional database 110 may be in communication with the portal server 108 for storage of session management information, content, etc. Session management system 100 also includes one or more application servers 114 in communication with the portal server 108 via a network 112 in the depicted embodiment. Each application server 114 may contain one or more backend applications 124 to provide content, information, or services to be displayed on the portal site provided by the portal server 108.

In session management system 100, any of the client computer systems 102, the portal server 108, the database 110, and the application servers 114 may be located at the same location, such as in the same building or computer lab, or could be remote. While the term "remote" is used with reference to the distance between the components of session management system 100, the term is used in the sense of indicating separation of some sort, rather than in the sense of indicating a large physical distance between the systems. For example, any of the components of session management system 100 may be physically adjacent or located as part of the same computer system in some network arrangements.

A user may utilize a client computer system 102 and its associated browser 104 to facilitate the access and viewing of content from the portal server 108. Client computer systems 102 may include personal computers, workstations, servers, mainframe computers, notebook or laptop computers, tablet PCs, desktop computers, portable computer systems, PDAs, set-top boxes, mobile phones, wireless devices, or the like. Browser 104 may be a graphical browser application that allows a user to view Internet or intranet content such as Microsoft Corporation's Internet Explorer, Netscape Communication Corporation's Navigator, Mozilla, Apple Corporation's Safari, etc. Using a browser 104, a user may connect to a given portal site, download content from that site, and view that content. To view additional content (i.e., content from an application server 114), the user designates a new network address (such as by selecting a link on the portal site) whose contents then replace the previously displayed information on the user's browser 104.

Network 106 may be any type of data communications channel, such as the Internet, an intranet, a LAN, a WAN, an Ethernet network, wireless networks, etc. The Internet or other public network may be particularly useful as network 106 when the client computer systems 102 are accessing a public portal hosted on portal server 108 as communications between these will be facilitated. Those skilled in the art will recognize, however, that the invention described herein may be implemented utilizing any type of data communications channel.

The portal server 108 provides an interface between the users on the client computer systems 102 and other content, including content located on backend applications 124 and/or application servers 114. The portal server 108 may contain one or more portlet application modules 122. Each portlet application module 122 may access one or more backend applications 124. The portal server 108 may be one or more of any type of computer system, including servers, personal computers, workstations, mainframe computers, notebook or laptop computer, desktop computers, or the like. In one embodiment, the portal server 108 is an IBM® eServer or similar server. In this embodiment, the portal server 108 may include software such as IBM®'s WebSphere Portal application that provides an integrated portal solution for business-to-employee, business-to-consumer, and business-to-business interactions.

The portal server 108 may contain both content provided by the owner of the portal server 108 as well as content provided by any of the backend applications 124 and/or application servers 114. The content may be displayed to the user via an initial view, or front page, which includes a variety of modules or frames. The format or layout of each page of the portal may be configured by an administrator, based on user preferences, etc. Each module or frame may contain content provided by the portal server 108, an application server 114, a backend application 124, or any combination thereof. The content may include any type of information, applications, databases, services, informational content, e-commerce offerings, advertisements, etc. Some of the modules and frames may be user-selectable, whereas others may be mandatory elements of the portal. A user may access the content by selecting or interacting with the appropriate link from the portal site. For example, a general use Internet portal may contain a news module, a sports module, and a weather module. Each of these modules in this example may contain an indication of content located in a backend application 124 on an application server 114. In this example, a user might see a few headlines in the new module and if they select one of the headlines, the portal server 108 would facilitate acquiring additional content (i.e., the full news story) from the backend application 124 that provides the news module.

When a user on a client computer system 102 accesses a portal server 108 page, a portal session may be established by the portal server 108 when the user logs into the portal server using identification and authentication information. Optional user identification and authentication information (e.g., user identification and password) may be required. Login information and user preferences may be stored as a cookie on the client computer system 102 so that information and preferences do not need to be reentered each time the user accesses the portal. When the user has a cookie on their client computer system 102, the portal server 108 accesses this cookie and adjusts the information or content sent to the user for display.

Portlet application module 122 hosted on portal server 108 may connect to the application servers 114 via a network 112. Network 112 may be any type of data communications channel, such as the Internet, an intranet, a LAN, a WAN, an Ethernet network, wireless networks, etc. In one embodiment, network 112 is a separate network than network 106, but in other embodiments, network 112 and network 106 may be equivalent, multiple networks may be included in network 112, etc.

Each application server 114 may include one or more backend applications 124. Backend applications 124 may be any application that may be used to provide services, content, or information to a portal site. Example backend applications 124 include news, sports ticker, weather, ski report, search, television guide, movie times, or any other types of applications. Each application server 114 may be one or more of any type of computer system, including servers, personal computers, workstations, mainframe computers, notebook or laptop computer. desktop computers, or the like. In one embodiment, an application server 114 may be an IBM® eServer or similar server. Each application server 114 may be owned by the same employer (e.g., in a corporate intranet), by different companies or providers, etc.

As described above, the portal server 108 also contains a session manager 116, a consolidation module 118, and a session data cache 120 in the depicted embodiment. The session manager 116 of the portal server 108 may, in one embodiment, manage sessions for a user of a client computer system 102. The session manager 116 may manage both the user's session identifier with the portal server 108 and any user sessions with an application server 114. Management of sessions may include receiving content or other information from an application server 114 and passing it to the client computer system 102, and it may also include receiving information from the client computer system 102 and forwarding it to a backend application at an application server 114. Session information from these sessions may be stored in session data cache 120, which may be located at the portal server 108, at a database 110, or in another location. Session information may include portal session identifiers, user identifiers, session numbers, application session information, etc. The application session information may include a session identifier, session format (cookie, URL rewriting, HTML hidden fields, etc.) and a session string extracted from the original content transmission of a backend application 124, etc.

The consolidation module 118 consolidates application session data received from an application server 114 with session data located in the session data cache 120. For example, if a new application session identifier is received (i.e., one that is not already in the session data cache 120), the consolidation module 118 adds that application session identifier, along with other application session information, to the session data cache 120. This allows the contents of the session data cache 120 to be continually updated as additional backend applications 124 and/or application servers 114 are accessed.

The portlet application module 122 provides for interaction with the application server 114 in one embodiment. The portlet application module 122 may receive communications from the application server 114, such as content that was requested by a user on a client computer system 102 or application session data related to the user's session on the backend application 124. The portlet application module 122 may also transmit information to the application server 114, such as requests from the user for content, application session data, etc.

In session management system 100, a user on a client computer system 102 may select a link or button from a portal site that corresponds to a backend application 124 located at an application server 114. The user's request for content made via selecting the link or button is received by the portal server 108. A portal session may be established with the user when the user first logs in to the portal server and a portal session identifier may then be saved in the session data cache 120. The session manager 116 may then query the session data cache 120 to determine if a session with the backend application 124 has already been established. If an application session has already been established, the application session data may be accessed from the session data cache 120 and the user's request may be forwarded to the application server 114 (and thus the backend application 124) with the inserted application session data for the user's session with that backend application 124.

When a backend application 124 transmits content to a user, the content is transmitted to the portal server 108 with (in the case of URL rewriting or HTML hidden filed) or without (in the case of a cookie) the application session data associated with the user's session. The session manager 116 strips out the session data from the content if it exists, consolidates the application data with the session data cache 120, and then forwards the content to the user on the client computer system 102 (with the application session data deleted). From the user's perspective, only the portal session data is ever needed, as all communications between the portal server 108 and the client computer system 102 utilize the portal session data.

Eliminating the necessity of communicating application session data to the client computer system 104 may, in many embodiments, eliminate the possibility of session data collision. If two backend applications 124 happen to use the same session identifier, this may be resolved by the session manager 116 by review of the session information stored in the session data cache 120, as the application session information for each backend application 124 may be identified by both user's portal session identifier and the application name in the session data cache for each user. In addition, the session management system 100 of the disclosed embodiments may also reduce network traffic as multiple types of session data (i.e., for each backend application 124) need not be transmitted to the user. No modifications to the browser 104 of the user or the backend application 124 are necessary for the operation of the session management system 100 in some embodiments, assisting with backwards- and forwards-compatibility.

Figure 2:
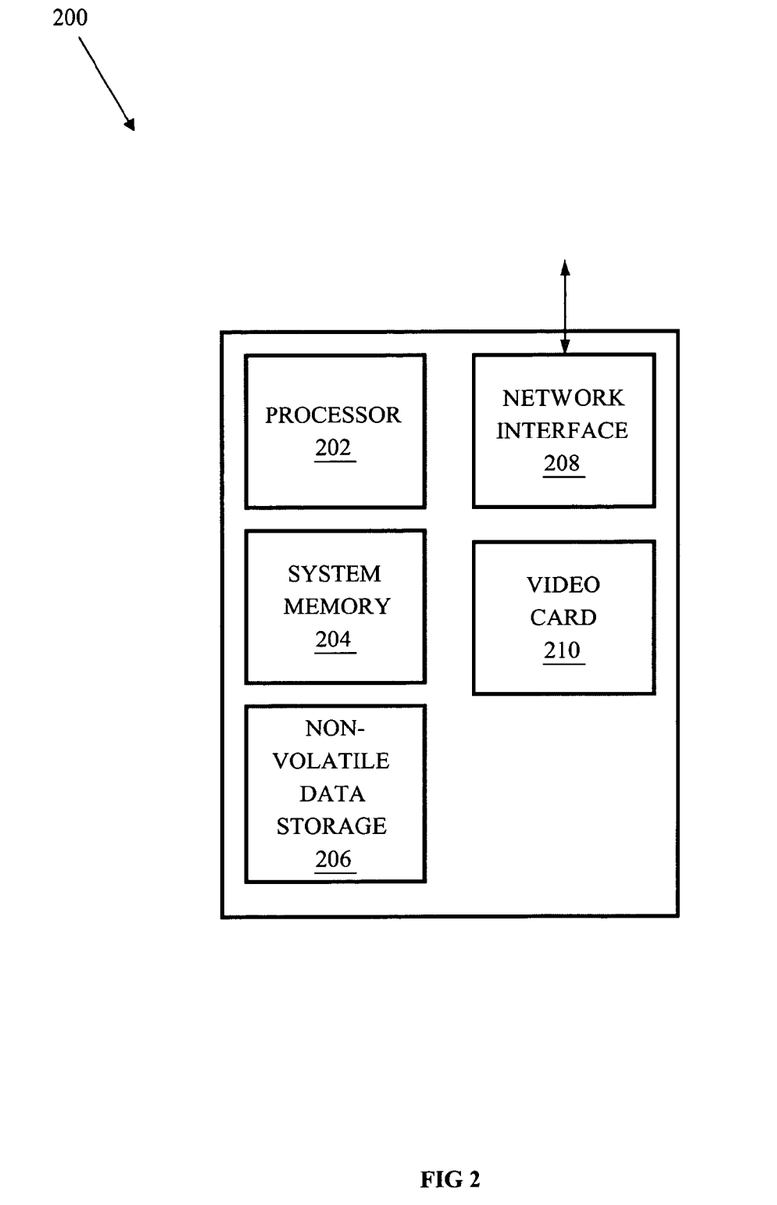
FIG. 2 depicts a block diagram of certain components of a processing device such as a personal computer.

FIG. 2 depicts a block diagram of certain components of a processing device such as a computer system. The computer system 200 of FIG. 2 may be suitable for use as a client computer system 102, a portal server 108, or an application server 114. Other possibilities for the computer system 200, client computer system 102, a portal server 108, or application server 114 are possible, including a computer having capabilities other than those ascribed herein to a "computer system", and possibly beyond those capabilities, and they may, in other embodiments, be any combination of processing devices such as workstations, servers, mainframe computers, notebook or laptop computers, desktop computers, PDAs, mobile phones, or the like.

In the depicted embodiment, computer system 200 includes a processor 202, system memory 204, non-volatile data storage 206, a network interface 208, and a video card 210. The components of computer system 200 may be mounted or connect to the system planar or other hardware of the computer system. Processor(s) 202 may provide processing power to computer system 200 and may be an Intel Pentium processor, Cyrix 586-P75 processor or Advanced Micro Devices 8486 processor or any other suitable processor. System memory 204 may include random access memory (RAM) such as double data rate (DDR) synchronous dynamic random access memory (SDRAM) and may be composed of one or more memory modules. Non-volatile data storage 206 may include either removable medium direct access storage devices (DASD) such as a floppy disk drive, CD-ROM drive, or DVD-ROM drive or a fixed medium DASD such as a hard disk drive.

Network interface 208 may provide for transmission and receipt of information from computer system 100, such as in the form of data packets. In one embodiment, the network interface 208 assembles the data to be transmitted into a packet with address and error detection fields for transmission. Similarly, during reception of a packet, the network interface 208 disassembles the packet and performs address checking and error detection in this embodiment. The network interface 208 may be a Local Area Network (LAN) adapter, a network interface card (NIC), or the like. Video card 210 provides for the display of graphics and other video to a user via a video display device such as a monitor. Video card 210 may contain a video controller and video memory and may be in communication with system memory 204 via a port such as an accelerated graphics port (AGP).

Figure 3:
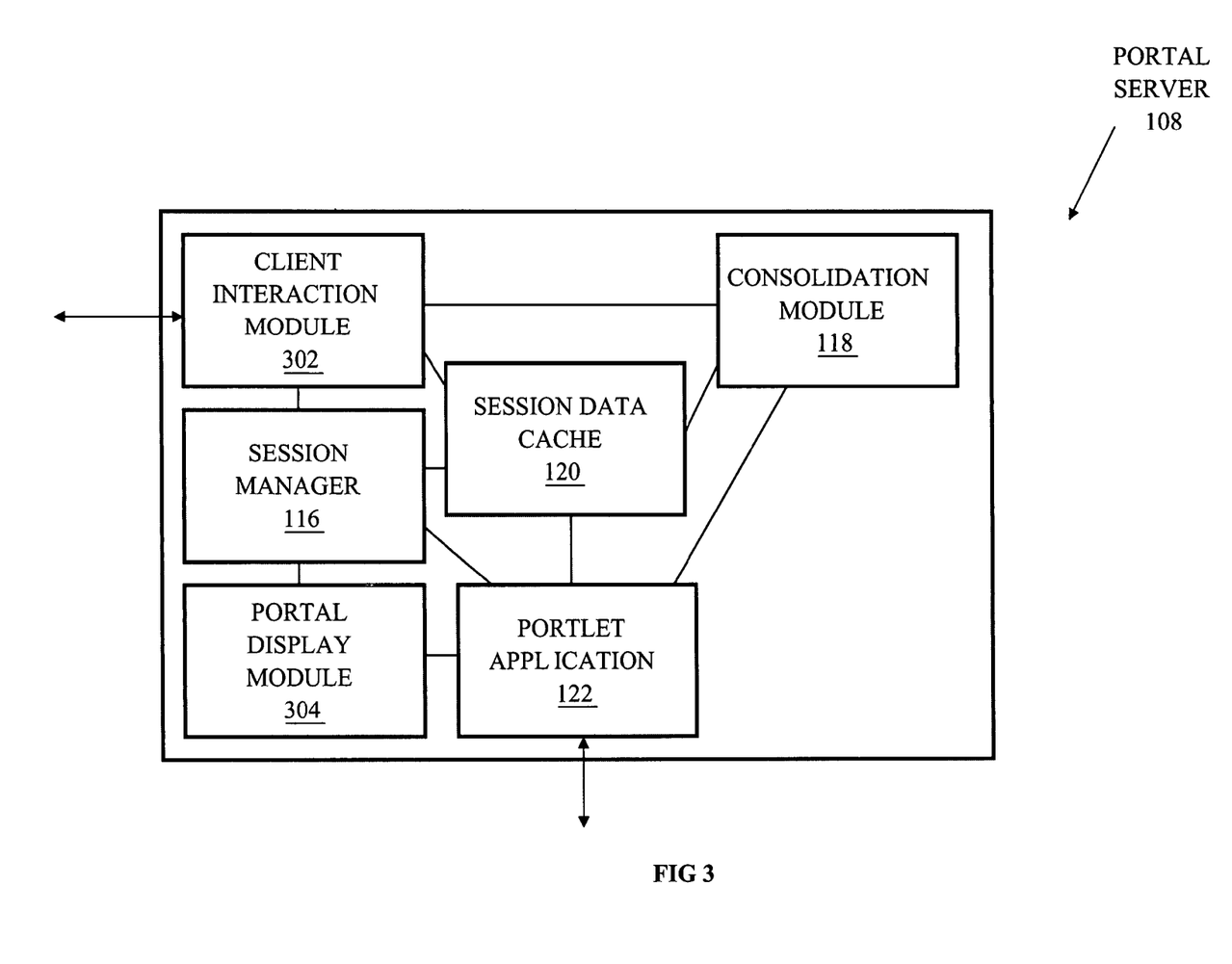
FIG. 3 depicts a portal server of the session management system according to one embodiment.

FIG. 3 depicts a portal server 108 of the session management system 100 according to one embodiment. In the depicted embodiment, portal server 108 includes a client interaction module 302, a portal display module 304, a portlet application module 122, a session manager 116, a consolidation module 118, and a session data cache 120. The session manager 116, consolidation module 118, session data cache 120, and portlet application module 122 are described in relation to FIG. 2 and the discussion of these components shall not be repeated in the interests of brevity.

The client interaction module 302 provides for interaction with the user on the client computer system 102 in one embodiment. The client interaction module 302 may receive communications from the client computer system 102, such as requests to display a page of the portal site, requests to access a separate link or page (such as from a backend application 124), user authentication information (i.e., user identification and password), etc. The client interaction module 302 may also transmit information to the client computer system 102, such as content from the backend application 124 or the portal server. 108 to be displayed to the user, portal session information, etc.

The portal display module 304 creates, aggregates, and/or organizes the content to be displayed on a portal page that will ultimately be transmitted and displayed to a user on a client computer system 102. The format or layout of each page of the portal may be configured by an administrator, based on user preferences, etc. In one embodiment, some content may be displayed in frames on the portal page. Each module or frame may contain content provided by the portal server 108, an application server 114, a backend application 124, or any combination thereof. For example, a frame may contain content from a particular backend application 124 and/or application server 114, such as a news service backend application 124 that provides news to users. In an alternative embodiment, a frame may contain content from multiple sources, such as a frame that contains content from two backend applications 124. The portal display module 304 may create multiple pages to be displayed that may be switched based on the user identity, actions of the user (e.g., selecting options that result in a new page), user requests for content from a backend application 124, etc.

Figure 4:
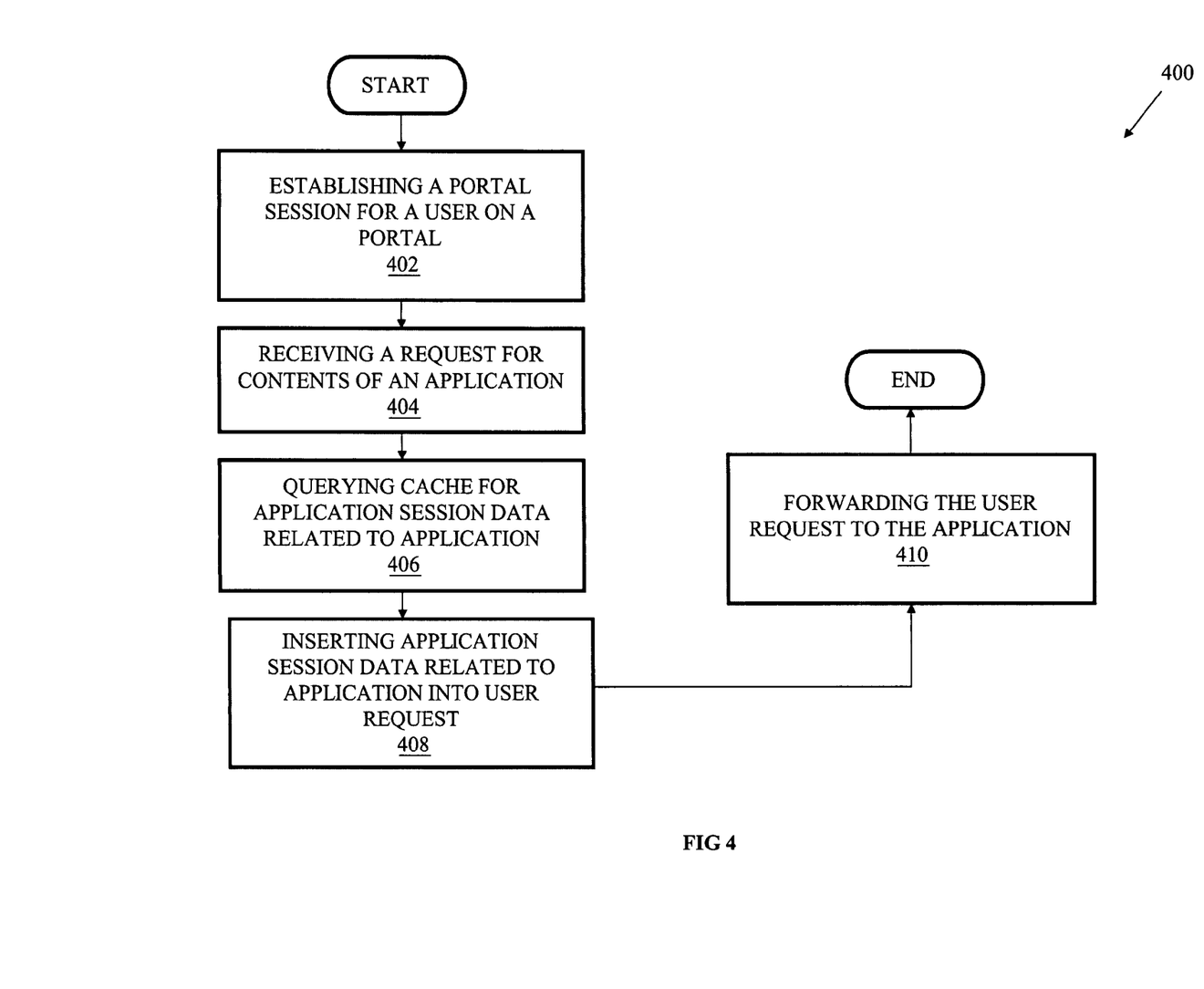
FIG. 4 depicts an example of a flow chart for managing a user request for content of a backend application according to one embodiment.

FIG. 4 depicts an example of a flow chart for managing a user request for content of a backend application 124 according to one embodiment. The method of flow chart 400 may be performed, in one embodiment, by the portal server 108. Flow chart 400 begins with element 402, establishing a portal session for a user on a portal. In one embodiment of element 402, the portal server 108 establishes a portal session with the user and/or the client computer system 102. The portal server 108 may establish a session when the user first logs into the portal server. In one embodiment, authentication of the user by password, user identification or other methodology is required before a portal session is granted. When a portal session is established, the portal session identifier may be saved in the session data cache 120.

The method of flow chart 400 continues to element 404, receiving a request for the contents of a backend application 124. In this element, the portal server 108 receives a transmission for a client computer system 102 that indicates a request by the user for the contents of a particular application, such as a backend application 124 on an application server 114. The user's request may originate from, for example, selecting a link or pushing a button associated with the backend application 124 from the portal page. The request may optionally include portal session information identifying the user and/or the session identifier.

In one embodiment of element 406, the portal server 108 queries the session data cache 120 for session data related to the backend application 124 (i.e., application session data) for which content has been requested. In this embodiment, the session data for the user's application session may be retrieved from the session data cache 120. Application session data for a user may be created by an application server 114 when a user establishes a session with the application server 114 when the user logs into the application server. The application session data may be stored in a table as described in more detail in relation to FIG. 6. After the application session data is accessed in element 406, the method of flow chart 400 continues to element 408, inserting the application session data related to the backend application 124 into the user request. In this element, the application session data may be inserted into the user request in the same format as that in the original response from the backend application. By inserting the appropriate application session data into the user request, the backend application 124 and the application server 114 receive the application session data that they are expecting in element 410, forwarding the user request to the backend application 124. After element 410, the method terminates.

Figure 5:
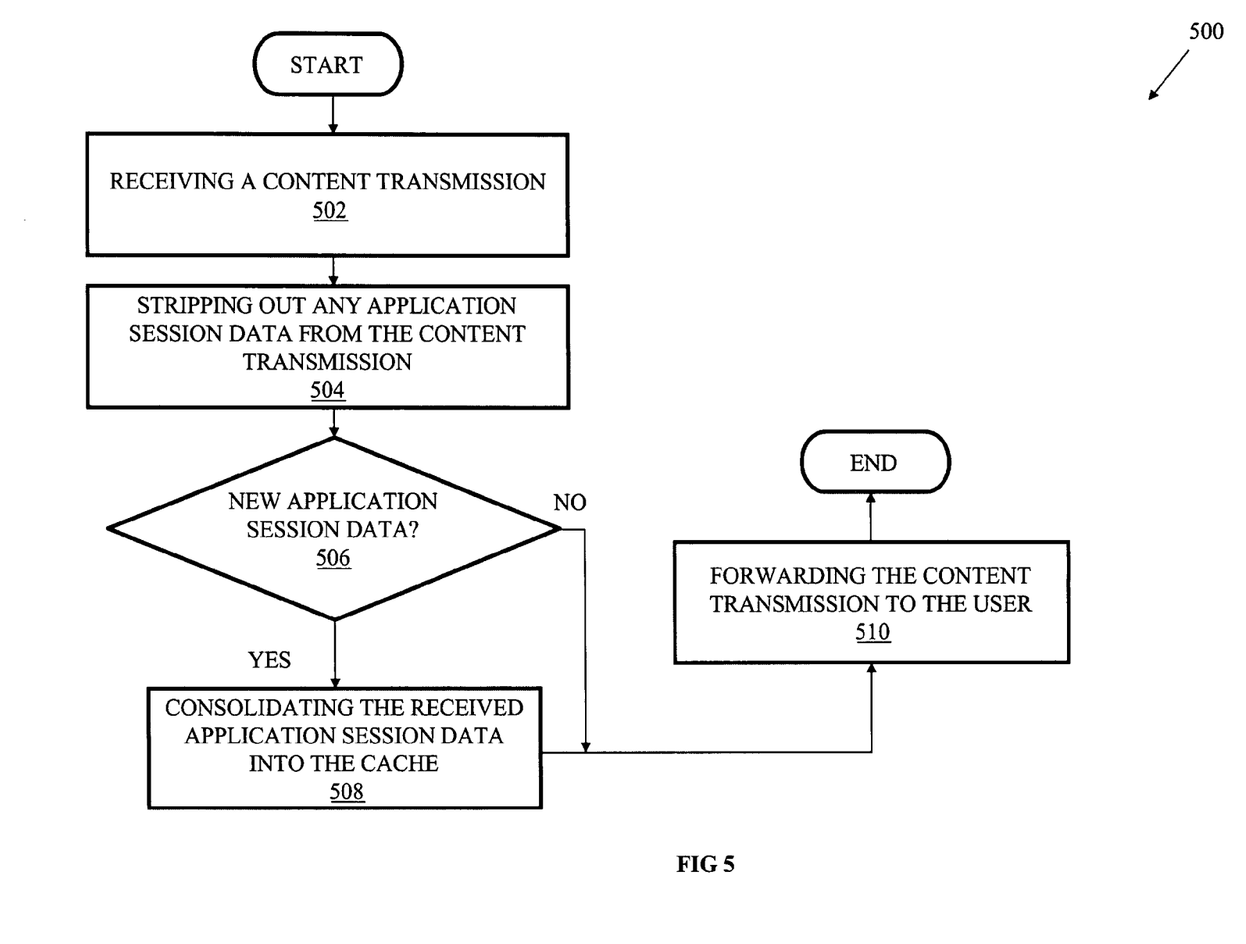
FIG. 5 depicts an example of a flow chart for managing application session data and forwarding content to a user according to one embodiment.

FIG. 5 depicts an example of a flow chart for managing application session data and forwarding content to a user according to one embodiment. The method of flow chart 500 may be performed, in one embodiment, by the portal server 108. Flow chart 500 begins with clement 502, receiving a content transmission which may have application session data within it. The content transmission may be any type of communication, such as data packets, received from an application server 114 and/or backend application 124. The content transmission may include any type of information, such as application session data, content requested by the user, other types of content, etc. In one embodiment, the transmission content includes content requested by a user and applications session data for that user's session on the backend application 124. In another embodiment, if a backend application 124 utilizes cookies exclusively for application session data, application session data is included in only the first response to the user and not to subsequent responses, so that subsequent responses will not include any application session data. Subsequent user request, however, do include application session data.

The method of flow chart 500 continues to element 504, where any application session data may be stripped out from the content transmission. If no application session data is included in the content transmission, this element may simply be skipped. The method of flow chart 500 continues to decision block 506, where determining whether any application session data received in element 502 as part of the content transmission and stripped out in element 504 is new. The method of flow chart 500 may query the session data cache 120 in order to determine whether the received application session data is new (i.e., has not already been saved in the session data cache 120). If the application session data is not new and is already saved in the session data cache 120, the flow chart continues to element 510. If the application session data is new, the received application session data may be consolidated into the session data cache 120 in element 506. To consolidate the new application session data, any new application session data may be simply added to the session data cache 120 in one embodiment. In one example, the new application session data may be added to the entry for the user associated with the application session data. In another example, a new entry in the session data cache 120 may be added to store the new application session data. In yet another embodiment, if some of the application session data is duplicative of information in the session data cache 120, only the new parts of the application session data may be saved. After the new application session data is consolidated into the session data cache 120, the method of flow chart 500 continues to element 510. In element 510, the content transmission (without application session data) may be forwarded to the user, after which the method terminates.

Figure 6:
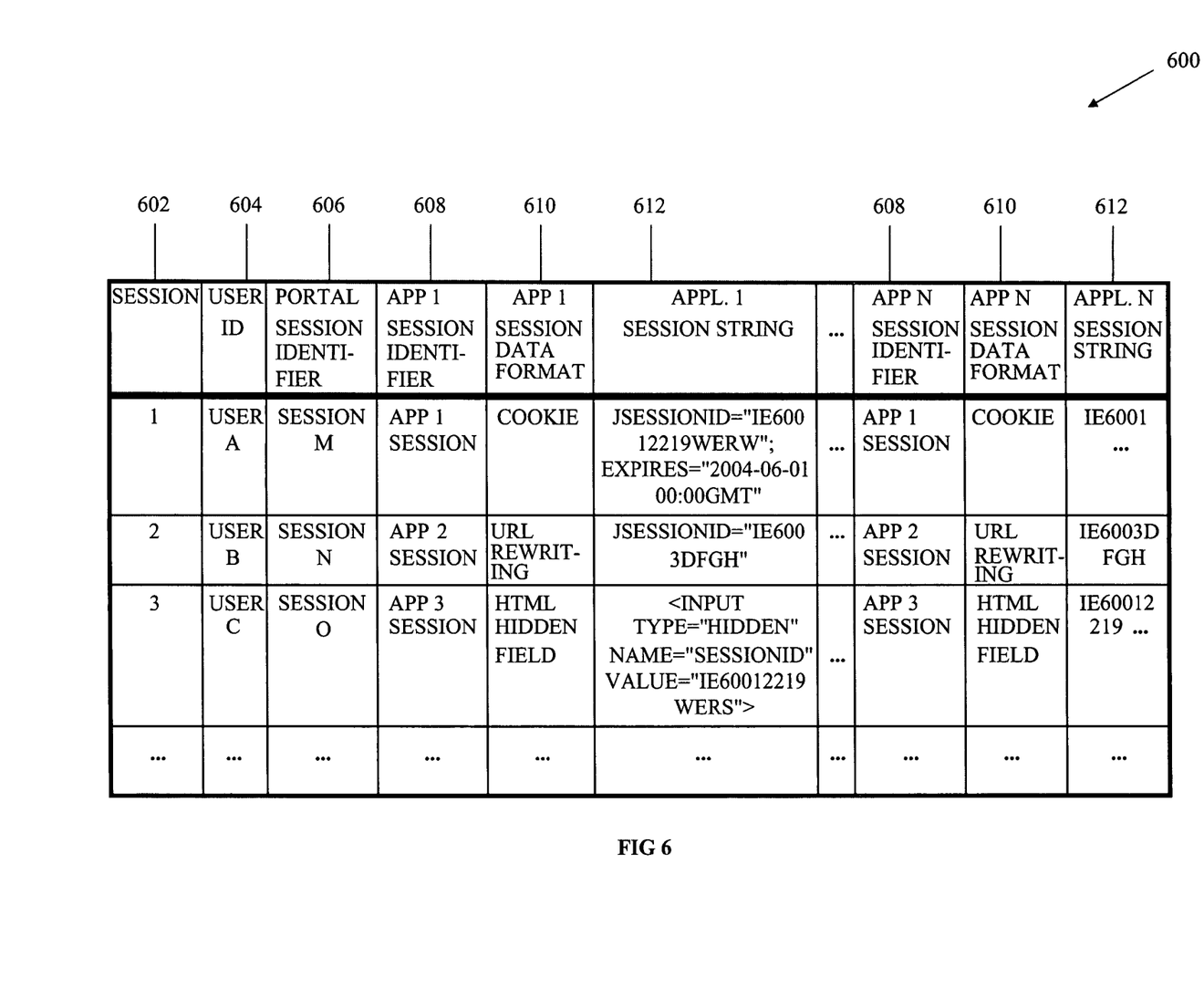
FIG. 6 depicts a representation of a session data table maintained by the portal server according to one embodiment.

FIG. 6 depicts a representation of a session data table 600 maintained by the portal server 108 according to one embodiment. Session data table 600 may be stored in the session data cache 120, which may be located on the portal server 108, database 110, or elsewhere. Session data table 600 includes, in the depicted embodiment, columns for a session number 602, a user identifier 604, a portal session identifier 606, and one or more columns for application session data, including application session data identifiers 608, application session data formats 610, and application session strings 610. Each row of session data table 600 corresponds to different user and/or client computer system 102 in the depicted embodiment, but a particular user and/or client computer system 102 may be located on multiple rows in other embodiments. The configuration of session data table 600 depicted in FIG. 6 is only a possible configuration of session data table 600, and one skilled in the art will recognize that many alternative configurations are possible.

The session number column 602 is an optional column that may hold an identifying number used by the portal server 108 for the user and/or client computer system 102 or to identify different sessions. The identifying number in the depicted embodiment is a sequentially increasing number, with the first user being '1', the second user being '2', and so on. Portal session information may be stored in columns 604 and 606. Column 604 contains user identification information, such as a user identification number, while column 606 contains a portal session identifier that identifies the session between the user on the client computer system 102 and the portal server 108. The portal session information, including the portal session identifier, may be generated when a portal session is established for the user on the portal server 108. The portal session identifier may be included in the content transmission at the portal server 108 in the methodology described in relation to FIG. 5.

The application session data columns 608, 610, and 612 of the depicted embodiment may include application session data about any sessions created by backend application servers 114 for a particular user or client computer system 102. In the depicted embodiment, application session data for multiple backend applications 124 may be stored (e.g., backend application 1, backend application N, and so on). Column 608 may include application session identifiers for any application sessions established between users and backend applications 124. Column 610 may include an indication of the format of the application session data for the application sessions (i.e., the session mechanism), such as in the form of cookies, URL rewriting, HTML hidden fields, or any other type of format. Column 612 may include application session strings that may be added by the application server 114 to the response to trace user states. Example application session strings are included in the column for Application 1. Application session data for multiple users may be stored in different rows, so that the application session data for a particular application is stored in one column. Accordingly, the session data table 600 may efficiently store the session data for multiple portal and application sessions.

Other types of information may be stored in the session data cache 120. For example, the user's state (e.g., logged in, timed out, logged out, etc.) may also be stored in the session data cache 120. Any type or combination of information may be stored in the session data cache 120.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing multiple sessions for a user on a portal. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing sessions, the method comprising:

establishing by a portal server a portal session with a user and saving a portal session identifier in a session information cache, the portal session being associated with a portal provided by the portal server;

receiving by the portal server a request from a user for contents of a backend application of a portal;

inserting by the portal server application session data for the backend application into the user request by querying the session information cache for application session data related to a session between the backend application and the user, the session information cache comprising session information for both the portal session and a plurality of sessions between backend applications and users;

forwarding by the portal server the user request with the inserted application session data to an application server associated with the backend application;

receiving by the portal server from the application server a content transmission having both content requested by the user and application session data from the backend application, the application session information comprising a session identifier;

consolidating by the portal server the received application session data into the session information cache;

removing by the portal server the user's application session data from the content transmission; and forwarding by the portal server the content transmission to the user.

\* \* \* \* \*

UNITED STATES PATENT AND TRADEMARK OFFICE
CERTIFICATE OF CORRECTION

PATENT NO. : 7,600,027 B2 Page 1 of 1
APPLICATION NO. : 10/942430
DATED : October 6, 2009
INVENTOR(S) : Shunguo Yan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1420 days.

Signed and Sealed this

Fifth Day of October, 2010

David J. Kappos
*Director of the United States Patent and Trademark Office*